United States Patent
Lee et al.

(10) Patent No.: US 7,656,888 B2
(45) Date of Patent: Feb. 2, 2010

(54) BI-DIRECTIONAL DETECTOR FOR ENABLING A HOST AND A CLIENT TO DETECT EACH OTHER IN A COLLECTION TERMINAL

(75) Inventors: Doo-Hwan Lee, Suwon-si (KR); Jung-A Yun, Suwon-si (KR); Myoung-Soo You, Seoul (KR); Ki-Hyun Kim, Uiwang-si (KR)

(73) Assignee: Samsung Electronics Co., Ltd (KR)

( * ) Notice: Subject to any disclaimer, the term of this patent is extended or adjusted under 35 U.S.C. 154(b) by 656 days.

(21) Appl. No.: 10/996,709

(22) Filed: Nov. 24, 2004

(65) Prior Publication Data

US 2005/0152282 A1 Jul. 14, 2005

(30) Foreign Application Priority Data

Jan. 8, 2004 (KR) .............. 10-2004-0001205

(51) Int. Cl.
*H04L 12/26* (2006.01)

(52) U.S. Cl. .............. 370/421; 710/72; 709/227

(58) Field of Classification Search .............. 370/252, 370/463, 419–421; 709/227, 228; 710/62, 710/72, 106, 107, 110, 313
See application file for complete search history.

(56) References Cited

U.S. PATENT DOCUMENTS

| | | | |
|---|---|---|---|
| 6,308,227 B1 * | 10/2001 | Kumar et al. ............ 710/4 |
| 6,397,089 B1 * | 5/2002 | Kabe ................. 455/572 |
| 6,529,744 B1 * | 3/2003 | Birkler et al. ........... 455/557 |
| 6,611,697 B1 * | 8/2003 | Ewing et al. .......... 455/575.1 |
| 6,714,802 B1 * | 3/2004 | Barvesten ........... 455/575.1 |
| 6,725,061 B1 * | 4/2004 | Hutchison et al. ....... 455/557 |
| 7,171,167 B2 * | 1/2007 | Lie et al. ............ 455/74.1 |
| 2006/0045112 A1 * | 3/2006 | Laiho ............... 370/419 |
| 2006/0089103 A1 * | 4/2006 | Osburn ............. 455/67.13 |

* cited by examiner

*Primary Examiner*—William Trost, IV
*Assistant Examiner*—Roberta A Shand
(74) *Attorney, Agent, or Firm*—The Farrell Law Firm, LLP

(57) ABSTRACT

A bi-directional detector which enables a host and a client in a collection terminal is disclosed. The bi-directional detector includes a client detection unit in the host part, for detecting the clients connected to the host part; a client identification unit for identifying types of the clients detected by the client detection unit; a host detection unit in each of the clients for detecting the host part; and a switch unit in each of the clients for determining whether to apply comparison power to the client detection unit and the host detection unit according to whether power is applied to the client. In the bi-directional detector, the client directly detects the host part and manages the connection, thereby reducing the load on the host part, without performing a step by which a host part responds to a connection request of a client.

5 Claims, 9 Drawing Sheets

| CLIENT | I/O DETECTION VOLTAGE | CLIENT INFORMATION LEVEL | CLIENT INFORMATION LEVEL [HEX] |
|---|---|---|---|
| 1 | CLIENT1 | 2.4 | 744 | 2E8 |
| 2 | CLIENT2 | 2.2 | 682 | 2AA |
| 3 | CLIENT3 | 2 | 620 | 26C |
| 4 | CLIENT4 | 1.8 | 558 | 22E |
| 5 | CLIENT5 | 1.6 | 496 | 1F0 |
| 6 | CLIENT6 | 1.4 | 434 | 1B2 |
| 7 | CLIENT7 | 1.2 | 372 | 174 |

FIG.8

BI-DIRECTIONAL DETECTOR FOR ENABLING A HOST AND A CLIENT TO DETECT EACH OTHER IN A COLLECTION TERMINAL

PRIORITY

This application claims priority to an application entitled "BI-DIRECTIONAL DETECTOR WHICH ENABLES HOST AND CLIENT DETECT EACH OTHER IN COLLECTION TERMINAL" filed in the Korean Intellectual Property Office on Jan. 8, 2004 and assigned Serial No. 2004-1205, the contents of which are hereby incorporated by reference.

BACKGROUND OF THE INVENTION

1. Field of the Invention

The present invention relates to a portable information terminal, and more particularly to a bi-directional detector, which enable a host and a client in a collection terminal connected to various function expanding devices, to detect each other.

2. Description of the Related Art

As wireless communication spreads and requests for mobile computing enabled by this spread of the wireless communication increase, a collection terminal has been developed for connecting a portable information terminal, such as a portable telephone or a personal digital assistant (PDA), to various devices. This development has expanded the functions of the collection terminal. A control module of the collection terminal used for controlling each of the devices is defined as a client and a control module for synthetically managing the clients is defined as a hostpart.

FIGS. 1A and 1B are block diagrams illustrating the concept of a collection terminal. FIG. 1A is a block diagram showing a general collection terminal. Referring to FIG. 1A, the general collection terminal includes one host part 11 and a plurality of clients 13 to 17 connected to the host part 11. FIG. 1B is a block diagram showing a collection terminal used as a telematics unit for vehicles. Referring to FIG. 1B, the collection terminal includes a charging unit 23, an audio unit 25, a navigation processing unit 27, a hands-free unit 29, and a control unit 21, which synthetically manages these units 23-29. In FIG. 1b, the control unit 21 operates as a host part of the collection terminal. Further, the charging unit 23, the audio unit 25, the navigation processing unit 27, and the hands-free unit 29 operate as clients for controlling corresponding devices.

In the conventional collection terminals having described above constructions, the host part receiving a connection request signal (hereinafter, referred to as an REQ) from the client, transmits an acknowledgment signal (hereinafter, referred to as an ACK) to the client, so that the client and the host part are connected to each other.

FIGS. 2A and 2B are flowcharts illustrating methods by which a host part of a collection terminal detects a client. Specifically, FIG. 2A is a flowchart illustrating a method by which the host part 11 of the collection terminal in FIG. 1A detects connections of the clients 13, 15, and 17 and responds to the detection. FIG. 2B is a flowchart illustrating a method by which the control unit 21 in FIG. 1B detects connections of the navigation processing unit 27, and the hands-free unit 29 and responds to the detection.

Referring to FIG. 2A, in step S31 the host part 11 receives a REQ from the client 13 and transmits an ACK with respect to the REQ of the client 13 in step S32. The host part 11, in step S33 receives a REQ from the client 15 and transmits an ACK with respect to the REQ of the client 15 in step S34. In step S36, the host part 11 receives a REQ from the client 17 and transmits an ACK with respect to the REQ of the client 17 in step S36. Accordingly, as the types and number of devices added to the collection terminal increases, the host part 11 must respond to a connection request for other devices while simultaneously controlling each device. Therefore, a system becomes overloaded.

Referring to FIG. 2B, in step S41 the control unit 21 receives a REQ from a navigation processing unit 27, transmits an ACK with respect to the REQ of the navigation processing unit 27 in step S42, and then starts an operation of the navigation processing unit 27 in step S43. As described above, when in step S44 the control unit 21 receives a REQ from another client, e.g., the hands-free unit 29 while performing its heavy load, such as a navigation operation in step S43, the control unit 21 cannot immediately respond. That is, after a predetermined delay time in step S45, the control unit 21 transmits an ACK to the hands-free unit 29 in step S46, because the control unit 21 spends system resources on the job which requires a heavy processing, such as management of the operation of the navigation processing unit 27.

FIG. 3 is a block diagram schematically showing a conventional client detector. Referring to FIG. 3, the client detector includes a host part 50 and a client 60. The host part 50 includes a client detection unit 51, a client identification unit 53, and a first interface unit (hereinafter, referred to as an I/F) 55. The client 60 includes a second interface unit (hereinafter, referred to as an I/F) 61.

The client or second I/F 61 forms a communication channel with the host or first I/F 55, transmits a REQ of the client 60 to the host part 50, and receives an ACK from the host part 50.

Meanwhile, the first I/F 55 receives the REQ of the client 60 from the second I/F 61 to transmit the received REQ to the client detection unit 51 and the client identification unit 53, and transmits an ACK for the REQ to the client 60.

The client detection unit 51 detects the client 60 in the client section on the basis of the REQ received through the first I/F 55, and the client identification unit 53 identifies the type of the detected client 60 in the client section.

In the conventional method described above, the host part responds to a REQ of each client. Accordingly, when a central processing unit (hereinafter, referred to as a CPU) of the host part is overloaded due to implementation of a predetermined operation, a response of the host part to the REQ of the client is delayed. As a result, a delay occurs when the client detects a connection with the host part and reacts to the detection.

Also, the client must periodically check a connection with the host part through a communication channel even after a connection has been already performed as well as in an initial connection step with the host part. Accordingly, a CPU overload, in responding to the clients' requests, occurs in the host part. This CPU overload in the host part causes the response delay by the client.

SUMMARY OF THE INVENTION

Accordingly, the present invention has been made to solve the above-mentioned problems occurring in the prior art, and a first object of the present invention is to provide a bi-directional detector for reducing a load in a host part for responding to a connection request signal of a client.

A second object of the present invention is to provide a bi-directional detector, in which a client of a collection terminal detects whether a host part is connected to the client and maintains a communication channel, thereby reducing a load in the host part.

In order to accomplish the aforementioned objects, according to an embodiment of the present invention, there is provided a bi-directional detector which enables a host and a client to detect each other in a collection terminal, the bi-directional detector including a client detection unit in the host part, which detects the clients connected to the host part; a client identification unit for identifying the types of clients detected by the client detection unit; a host detection unit in each of the clients, which detects the host part; and a switch unit in each of the clients, which determines whether or not to apply comparison power to the client detection unit and the host detection unit according to whether power is applied to the client.

BRIEF DESCRIPTION OF THE DRAWINGS

The above and other objects, features and advantages of the present invention will be more apparent from the following detailed description taken in conjunction with the accompanying drawings, in which:

FIG. 8 is an exemplary table showing I/O detection voltage values and client information level values according to the type of clients.

DETAILED DESCRIPTION OF THE PREFERRED EMBODIMENT

Hereinafter, a preferred embodiment according to the present invention will be described with reference to the accompanying drawings. In the following description of the present invention, a detailed description of known functions and configurations incorporated herein will be omitted when it may make the subject matter of the present invention rather unclear.

Figure 1A:
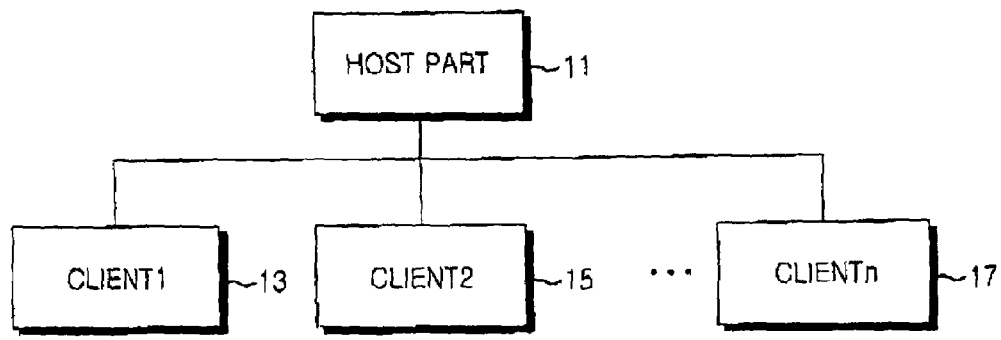
FIGS. 1a and 1b are block diagrams illustrating the concept of a collection terminal.
Figure 1B:
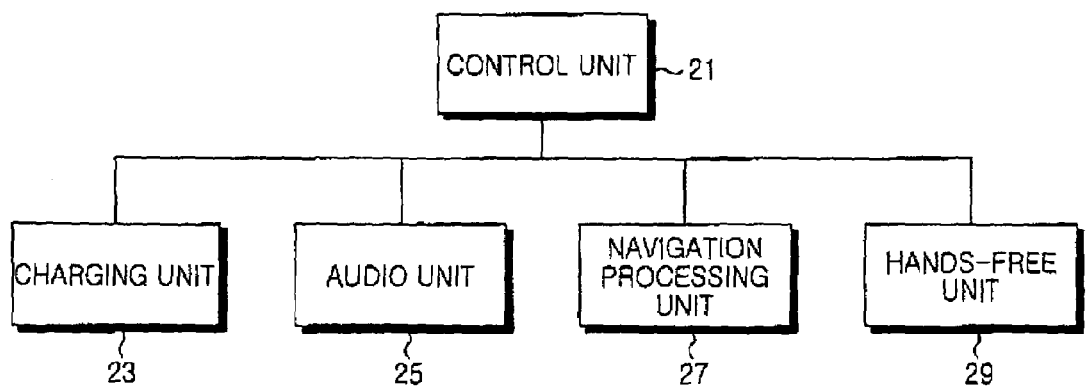
Figure 2A:
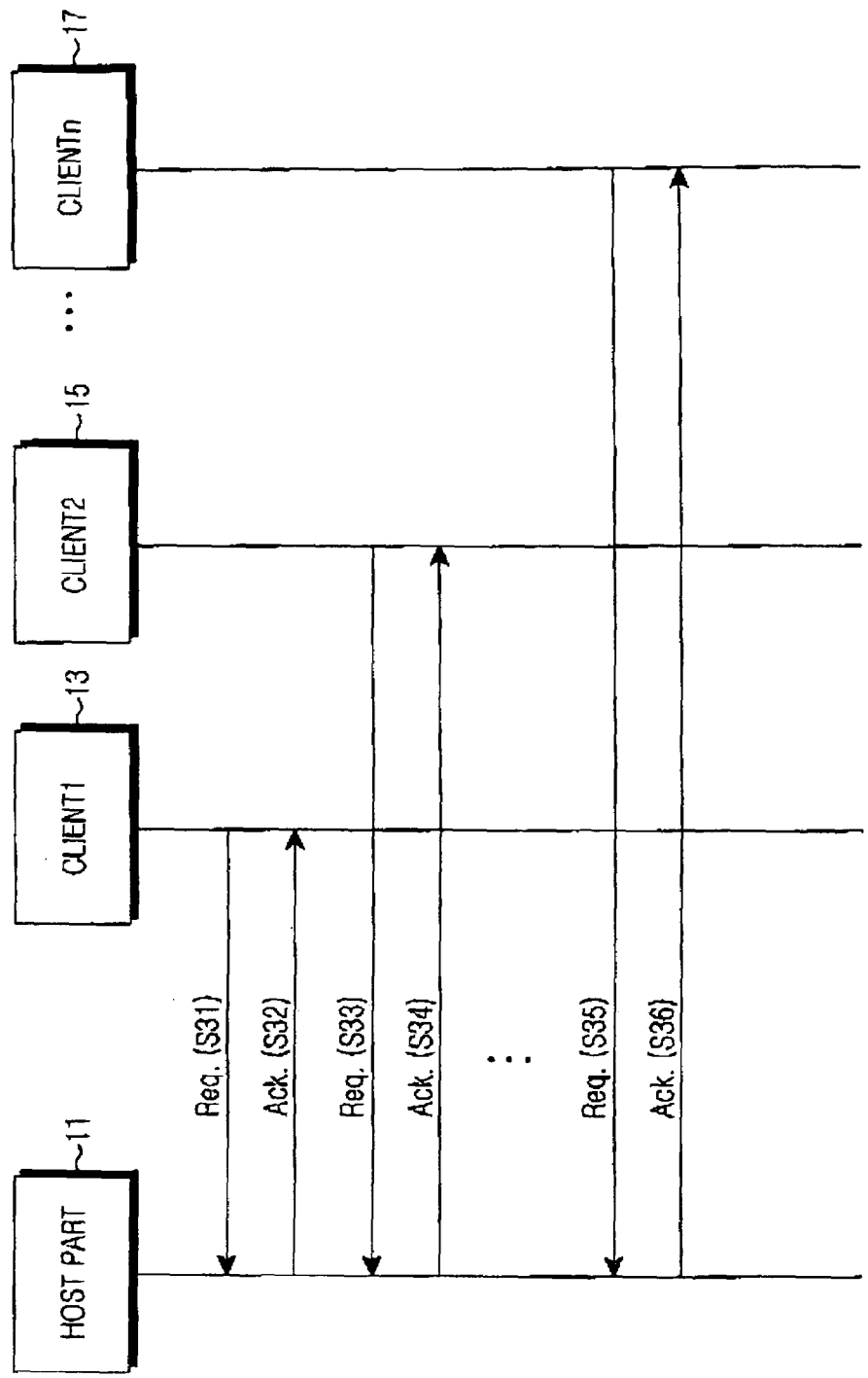
FIGS. 2a and 2b are flowcharts illustrating methods by which a host part in a collection terminal detects a client.
Figure 2B:
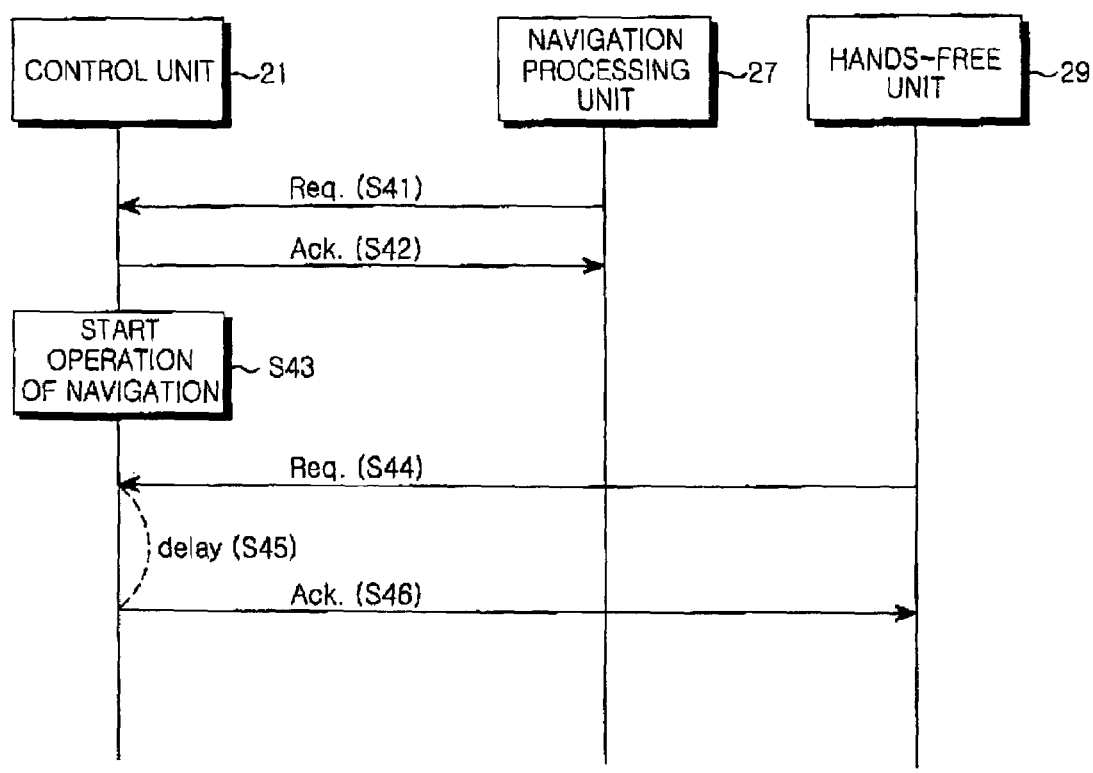
Figure 3:
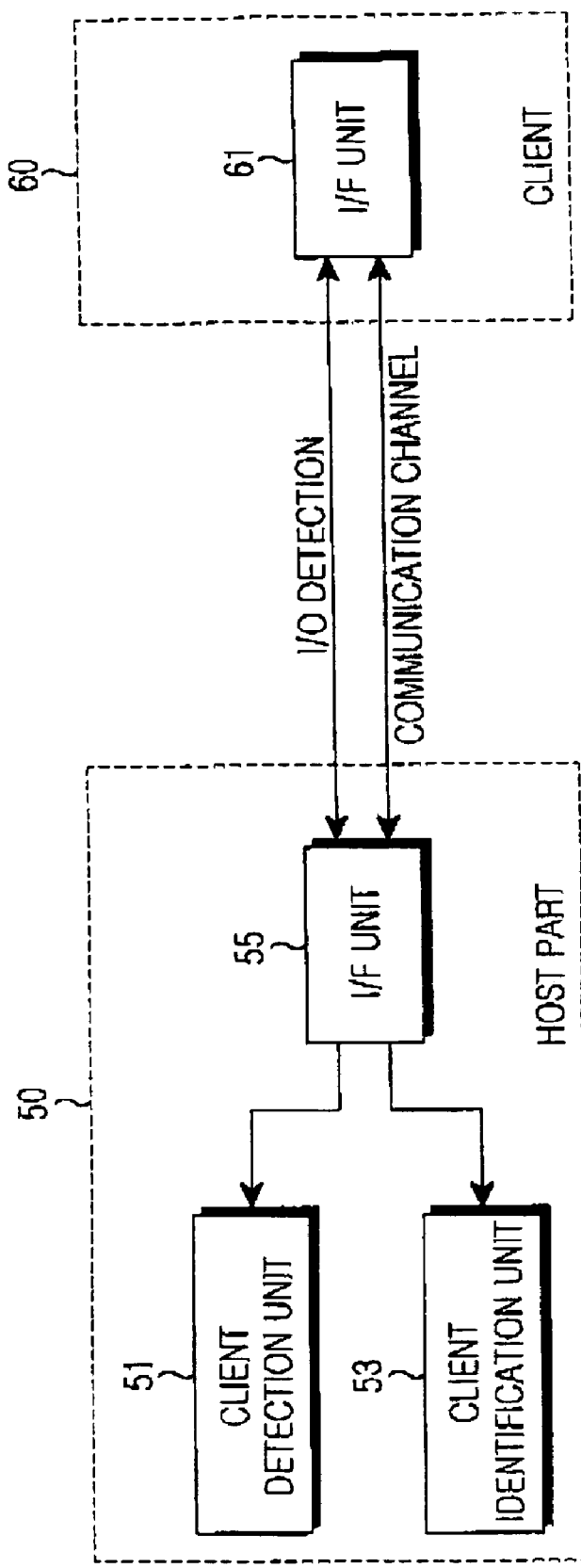
FIG. 3 is a block diagram schematically showing a conventional client detector.
Figure 4:
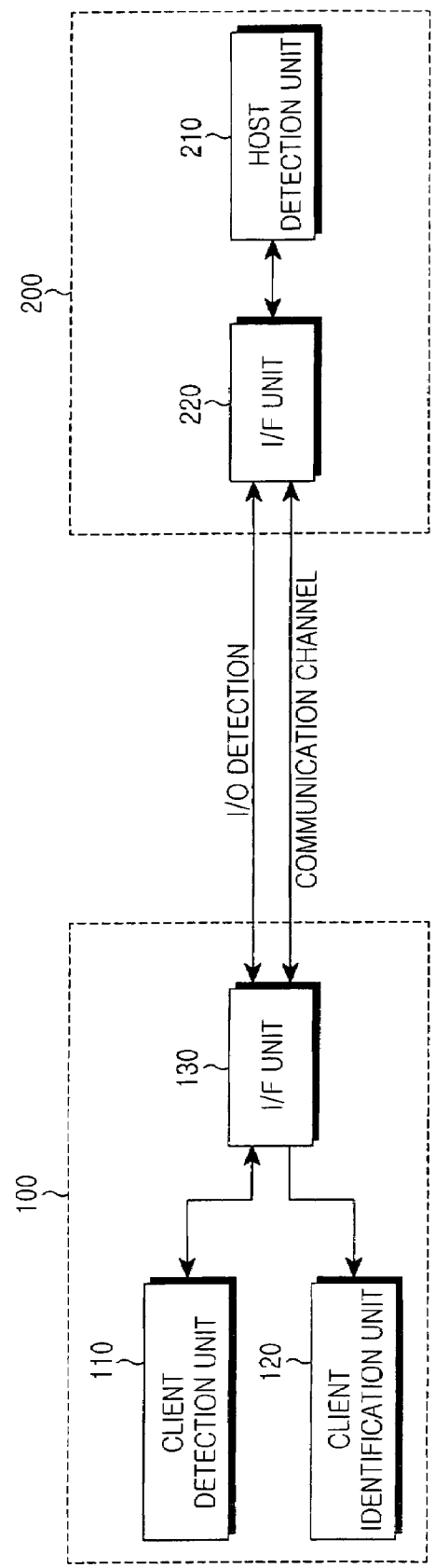
FIG. 4 is a block diagram schematically showing a bi-directional detector which enables a host part and a client to detect each other according to one embodiment of the present invention.

FIG. 4 is a block diagram schematically showing a bi-directional detector which enables a host part and a client detect each other according to one embodiment of the present invention. Referring to FIG. 4, the bi-directional detector which enables the host part and the client to detect each other according to one embodiment of the present invention includes a host part 100 and a client 200. The host part 100 includes a client detection unit 110, a client identification unit 120, and a first interface unit 130. The client 200 includes a host detection unit 210 and a second interface unit 220.

The first interface unit 130 receives a connection request signal of a client 200 from the second interface unit 220, transmits the received signal to the client detection unit 110 and the client identification unit 120, and transmits an acknowledgment signal for the connection request signal to the client 200.

The client detection unit 110 detects a connection of the client 200 according to the connection request signal received through the first interface unit 130, and the client identification unit 120 identifies a type of the client 200.

The second interface unit 220 receives the acknowledgment signal through the first interface unit 130, and receives a connection signal of the host part 100 to transmit the received signal to the host detection unit 210.

The host detection unit 210 detects the connection signal of the host part 100 received through the second interface unit 220, thereby recognizing that the host part 100 has been normally connected to the client 200.

According to the bi-directional detector as described above, the client 200 determines whether the host part 100 is connected and is normally operated, and maintains a communication channel, so that a load on a host part 100 incurred in checking whether the client 200 is normally connected to the host part 100 can be reduced.

Figure 5:
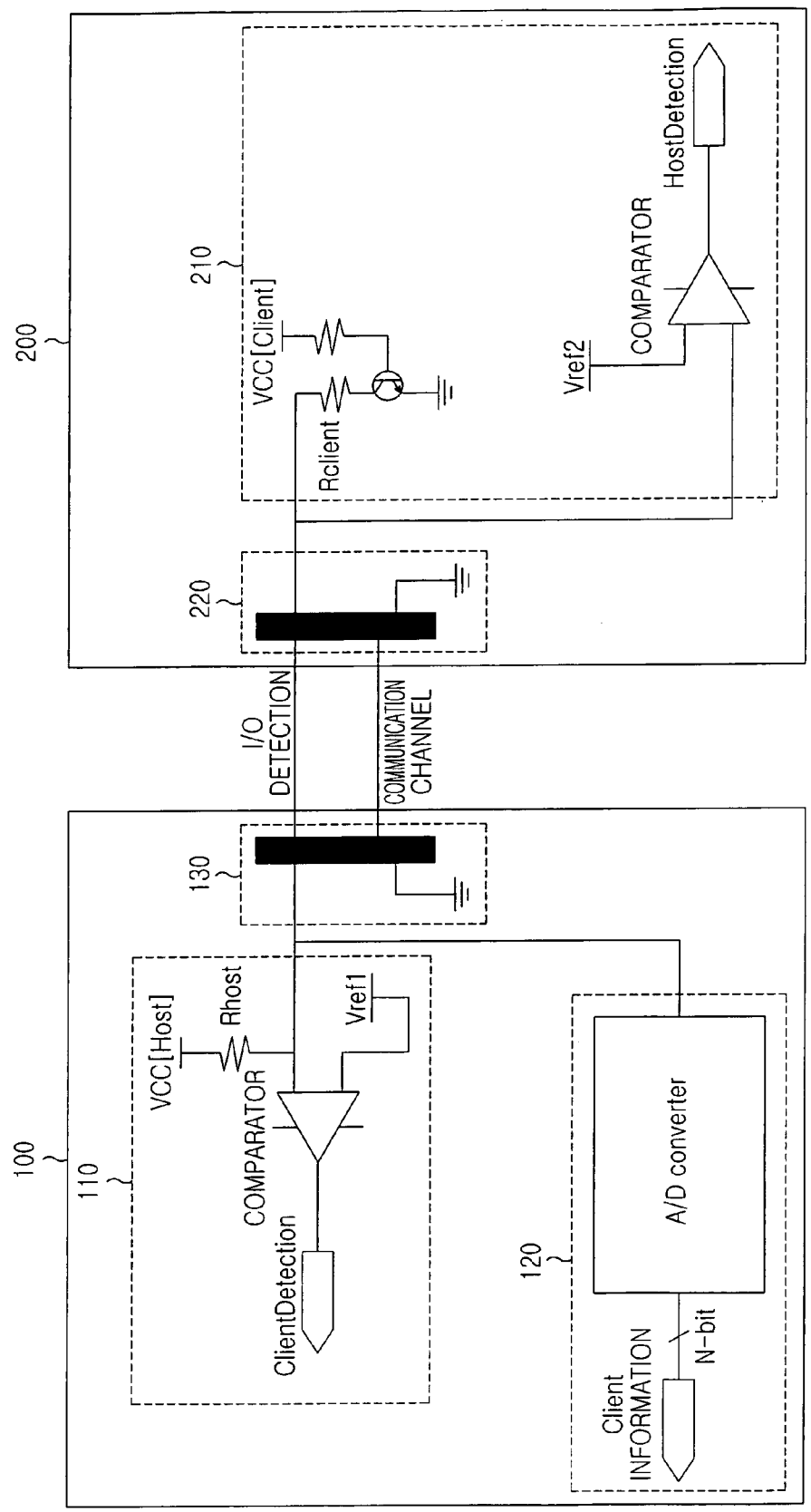
FIG. 5 is a circuit diagram showing the bi-directional detector which enables the host part and the client to detect each other according to one embodiment of the present invention.

FIG. 5 is a circuit diagram showing the bi-directional detector which enables the host part 100 and the client 200 to detect each other according to one embodiment of the present invention.

Referring to FIGS. 4 and 5, the client detection unit 110 includes a comparator which compares predetermined client-side voltage transmitted from the client 200 with a first reference voltage Vref1 set in advance. From the result of the comparison by the comparator, when the client-side voltage is larger than the first reference voltage Vref1, it is determined that the client is detected.

The client identification unit 120 includes an analog-to-digital converter (hereinafter, referred to as an A/D converter) for converting the predetermined client-side voltage transmitted from the client 200 into a digital value, and identifies a type of the client 200 according to an output value of the A/D converter. That is, as shown in FIG. 8, the clients connected to the host part have different I/O detection voltage values and client information level values according to the types of clients. Accordingly, the client identification unit 120 judges the values according to the voltage values transmitted from the clients, and identifies the types of clients from the result of the judgment. That is, the client identification unit 120 converts the I/O detection voltage value inputted from the client 200 into an hex level value, and judges the client 200 to be a client which corresponds to the nearest value in a table as shown in FIG. 8.

The first interface unit 130 and the second interface unit 220 detect an I/O between the host part 100 and the client 200, and forms a communication channel.

The host detection unit 210 includes a comparator which compares predetermined host-side voltage transmitted from the host part 100 with a second reference voltage Vref2 set in advance. From the result of the comparison by the comparator, when the host-side voltage is larger than the second reference voltage Vref2, it is determined that the host part 100 is detected.

Hereinafter, a process, by which the host part 100 and the client 200 detect an interconnection therebetween and judges an operation mode by means of the bi-directional detector according to the embodiment of the present invention as described above, will be described in more detail.

When a new client other than the client 200 is connected to the host part 100, or a signal of requesting a connection check generates from a client already connected to the host part 100, since voltage VCC(client) generates in the client 200, a transistor contained in the host detection unit 210 operates, and a resistor $R_{client}$ contained in the host detection unit 210 is connected to a ground GND. Then, voltage Vi is applied to one input terminal of the comparator of the host part 100. That is, the voltage Vi calculated by the following equation 1 is inputted to the input terminal of the comparator.

$$V_i = VCC[\text{Host}] * \frac{R_{client}}{R_{host} + R_{client}} \qquad \text{Equation 1}$$

The comparator contained in the client detection unit 110 outputs the comparison result between the first reference voltage Vref1 set in advance and the voltage Vi as a client detection signal. That is, a client detection is activated.

Meanwhile, the voltage Vi calculated by equation 1 is also applied to the client identification unit 120. Herein, the voltage Vi may have different values according to the resistance of the resistor $R_{client}$ in the host part 200. Accordingly, different resistance values are set in each client, and the client identification unit 120 identifies a corresponding client by means of the voltage Vi values differently calculated by the resistance values.

An example of the voltage values differently set in each client as described above is as shown in FIG. 8.

Meanwhile, the voltage Vi values calculated by Equation 1 is also applied to the other input terminal of the comparator of the host detection unit 210. Accordingly, the comparator contained in the host detection unit 210 outputs the comparison result between the voltage Vi and the second reference voltage Vref2 set in advance as a host detection signal. That is, a host detection is activated.

At this time, the transistor operates as a switch for applying a comparison voltage to the client detection unit 110 and the host detection unit 210 according to an operation mode of the client.

In the present invention as describe above, the transistor operated by whether the voltage VCC(client) is applied, and the comparator of outputting the comparison result between the second reference voltage Vref2 and the voltage Vi, are added to the client 200. Therefore, the client 200 also can detect the host part 100, thereby reducing the overload which may be put on the host part 100 when the connection of the client 200 is detected only by the host part 100. That is, when the client 200 detects the host part 100, the client 200 does not wait for a response of the host part 100 as in the prior art, but may directly try a connection with the host part 100. If a communication channel has been already formed between the host part 100 and the client 200, the communication channel is maintained by the result of the host detection by the client 200. When the client 200 or the host part 100 operates in an abnormal mode while the client 200 and the host part 100 normally operate, the bi-directional detector of the present invention shown in FIG. 5 operates as follows.

Firstly, when the client 200 operates in a standby mode, or the power of the client 200 is turned off while the host part 100 operate in the normal mode, since the voltage VCC(client) is turned off, the transistor connected between the resistor $R_{client}$ and the ground is turned on. Therefore, the voltage is not applied to the input terminal of the comparator of the host detection unit 210. Accordingly, the client detection is deactivated.

In contrast, when the host part 100 operates in the standby mode, or the power of the host part 100 is turned off while the client 200 operate in the normal mode, voltage VCC(host) is 0V. Accordingly, the I/O detection voltage of the host part 100 is 0V. Further, when this voltage passes through the comparator of the host detection unit 210, the host detection is deactivated.

Hereinafter, when both the host part 100 and the client 200 operate in the normal mode, each operation of the host part 100 and the client 200 will be described.

Firstly, when the host part 100 detects the connection of the client 200, the host detection unit 210 identifies the type of connected client 200 and the host part 100 performs a corresponding operation according to an identification result.

For instance, in a case of a simple client device, such as a charger or an external-type keyboard, which does not require a bi-direction communication, the host part 100 performs a program for a corresponding client device according to the value judged by the client identification unit 120. In contrast, in a case of a client device, such as a hands free kit or a telematics unit, which requires the bi-direction communication for synchronizing with the host part, the host part 100 performs a corresponding operation according to the result identified by the client identification unit 120. In addition, the host part 100 performs the bi-direction communication with a corresponding client device to check whether the client device is operating. For instance, as a result of the judgment by the client identification unit 120, when the client device is the telematics unit, the host part 100 performs a communication launcher to get ready for communicating with the client device. That is, when the host part 100 receives a connection request packet from the client device, the host part 100 transmits an acknowledge signal. Then, the host part 100 transmits various audio related information to the client device while a PDA unit and a communication launcher in the host part communicate with each other.

Meanwhile, when the client 200 detects that the host part 100 is connected to the client 200, the client 200 transmits the connection request packet to the host part 100. Herein, the client 200 periodically transmits the connection request packet until the host part 100 transmits the acknowledge signal. Then, when the client 200 receives the acknowledge signal from the host part 100, the client 200 recognizes a mode for communication. As described above, after recognizing the communication mode, the client 200 performs a corresponding communication operation. That is, the client 200 receives audio related information transmitted from the host part 100, performs an audio control according to the information, or transmits an event to the host part 100.

Figure 6:
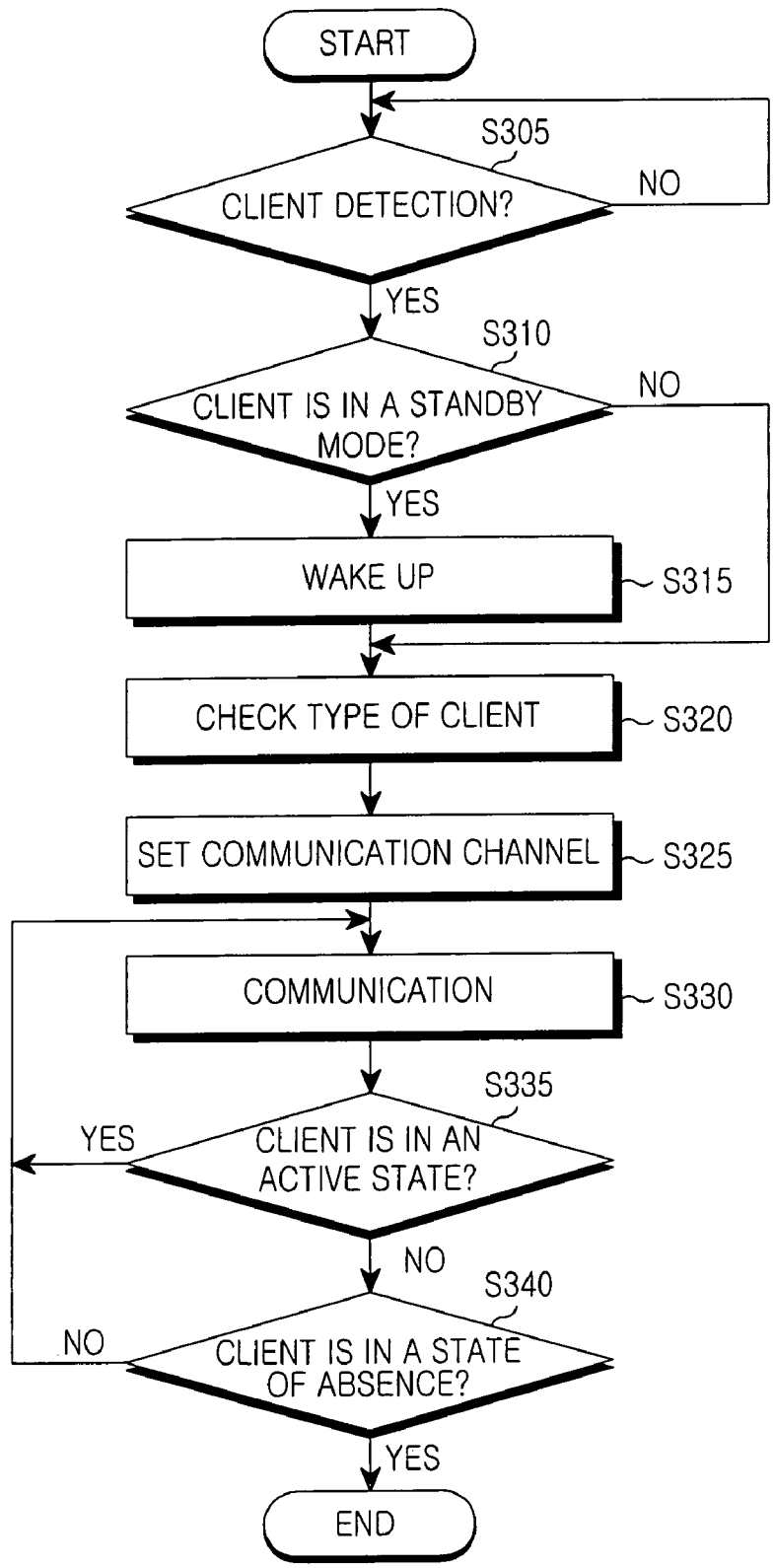
FIG. 6 is a flowchart illustrating a process for detecting a client in a bi-directional detector according to one embodiment of the present invention.

FIG. 6 is a flowchart illustrating a process for detecting a client in a bi-directional detector according to one embodiment of the present invention. That is, FIG. 6 is a flowchart showing a process by which a host part detects the client and operating according to a detection result.

Referring to FIG. 6, when in step S305, the client detection unit 110 detects a predetermined client, i.e., a client device, the host part determines in step S310 whether the client is in a standby mode. When the client is in a standby mode, the host part performs a wake-up process for the client in step S315, and in step S320 checks the type of the client. In contrast, when the client is not in a standby mode, the host directly performs the step S320 of checking the type of the client without performing the step S315. Herein, the type of the client is identified by means of the I/O voltage values differently set in each client device as described with reference FIGS. 4 and 5.

In step S325, after the type of the client is checked in step S320, the host part sets a communication channel between the host part and the client, and performs a communication between the host part and the client through the communication channel in step S330.

During a state in which the communication is performed, when the client is in a deactivated state, or the power is turned off and it is recognized in step S340 that the client is in a state of an absence, the host part ends the communication. Otherwise, if it is determined in step S335 that the client is in an active state, the host part continuously performs the communication.

Figure 7:
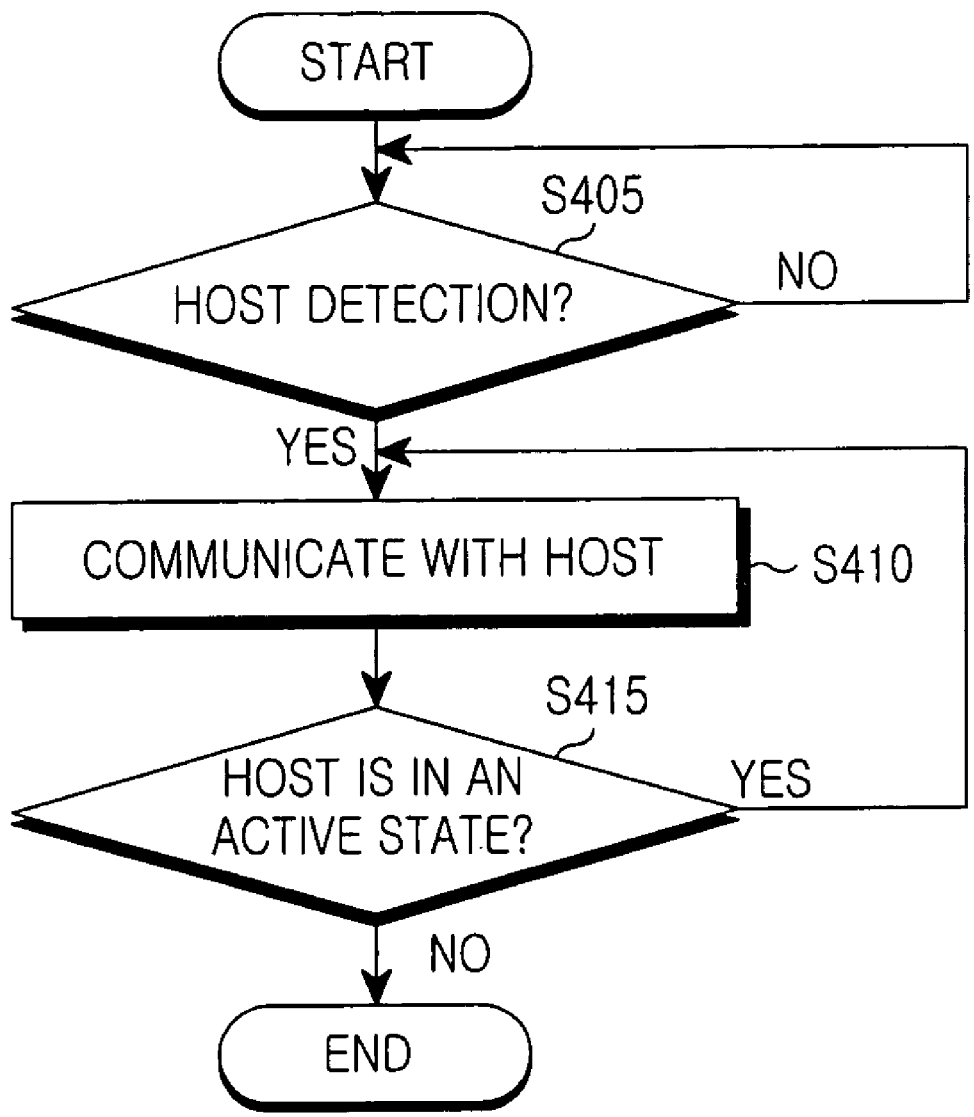
FIG. 7 is a flowchart illustrating a process for detecting a host part in a bi-directional detector according to one embodiment of the present invention.

FIG. 7 is a flowchart illustrating a process for detecting a host part in a bi-directional detector according to one embodiment of the present invention. Referring to FIG. 7, when the host detection unit 210 detects a host part in step S405, the client communicates with the host part in step S410. Further, during a state in which the communication is performed, when it is determined in step S415 that the host part is not in an active state, that is, in the deactivated state, the client ends the communication. Otherwise, the client continuously performs the communication.

As described above, without performing a step by which a host part responds to a connection request of a client, the client directly detects the host part and controls the connection, thereby reducing the load on the host part. Especially, a connection check, which has been performed by the existing host part only, can be actively performed by the client by means of a simple circuit using one pin. Further, the host part and the client can monitor the mutual operation state in real time. Therefore, the cost can be reduced and the system performance can be improved.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A bi-directional detector for enabling a host part and clients to detect whether the host part and the clients are electronically interconnected to each other in a collection terminal, the bi-directional detector comprising:
    a client detection unit in the host part for detecting at least one of a plurality of clients connected to the host part;
    a client identification unit for identifying types of the clients detected by the client detection unit;
    a host detection unit in each of the plurality of clients for detecting the host part and attempting a connection with the host part without waiting for a response from the host part;
    a switch unit in each of the clients for determining whether to apply comparison power to the client detection unit and the host detection unit according to whether power is applied to the client;
    a first interface unit in the host part; and
    a second interface unit in each of the plurality of clients;
    wherein the host part and the clients detect each other via the first interface unit and the second interface unit, and
    wherein the switch unit comprises an identification resistor having different values according to types of client devices connected to the plurality of clients, and a transistor connected between the identification resistor and a ground for grounding the identification resistor when the power is applied to the client.

2. The bi-directional detector as claimed in claim 1, wherein the client detection unit further comprises:
    a comparator for comparing predetermined voltage Vi proportional to the identification resistor with a first reference voltage set in advance, and outputting a client detection signal; and
    a first resistor connected between power of the host part and a first input terminal of the comparator.

3. The bi-directional detector as claimed in claim 2, wherein the predetermined voltage is calculated by $$V_i = VCC[\text{Host}] * \frac{R_{client}}{R_{host} + R_{client}},$$

wherein VCC represents power of the host part, $R_{client}$ represents the identification resistor, and $R_{host}$ represents the first resistor.

4. The bi-directional detector as claimed in claim 3, wherein the host detection unit includes a comparator for comparing $V_i$ with a second reference voltage set in advance, and outputting a host detection signal.

5. A method for enabling bi-directional detection between a host part and each of a plurality of clients in a collection terminal of whether the host part and the plurality of clients are electronically interconnected to each other, the method comprising the steps of:
    the host part detecting at least one of the plurality of clients connected to it;
    identifying a type of each detected client;
    each of the plurality of clients detecting the host part and attempting a connection with the host part without waiting for a response from the host part; and
    each of the clients determining whether to apply comparison power in accordance with the power being applied to the client by using a switch unit comprising an identification resistor having different values according to types of client devices connected to the plurality of clients, and a transistor connected between the identification resistor and a ground for grounding the identification resistor when power is applied to the client.

* * * * *